US009838779B2

(12) United States Patent
Li

(10) Patent No.: US 9,838,779 B2
(45) Date of Patent: *Dec. 5, 2017

(54) METHOD, SYSTEM AND APPARATUS FOR AUDIO COMMUNICATION MODULATION MODES SELF-ADAPTATION, AND ELECTRONIC SIGNATURE TOKEN

(71) Applicant: Tendyron Corporation, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 222 days.

This patent is subject to a terminal disclaimer.

(21) Appl. No.: 14/411,564

(22) PCT Filed: Jun. 13, 2013

(86) PCT No.: PCT/CN2013/077150
§ 371 (c)(1),
(2) Date: Dec. 29, 2014

(87) PCT Pub. No.: WO2014/000575
PCT Pub. Date: Jan. 3, 2014

(65) Prior Publication Data
US 2015/0163591 A1  Jun. 11, 2015

(30) Foreign Application Priority Data
Jun. 29, 2012 (CN) .......................... 2012 1 0226853

(51) Int. Cl.
*H04R 3/00* (2006.01)
*H04L 5/14* (2006.01)
*H04L 27/00* (2006.01)

(52) U.S. Cl.
CPC ............. *H04R 3/00* (2013.01); *H04L 5/1453* (2013.01); *H04L 27/0008* (2013.01);
(Continued)

(58) Field of Classification Search
CPC ............. H04L 27/0008; H04L 27/0012; H04L 5/1453; H04B 7/0621; H04B 7/0636
(Continued)

(56) References Cited

U.S. PATENT DOCUMENTS 6,443,891 B1 * 9/2002 Grevious ............. A61B 5/0002
128/903
7,310,531 B2 * 12/2007 Uchida ................. H04W 28/22
370/252
(Continued)

FOREIGN PATENT DOCUMENTS

CN 1960498 A 5/2007
CN 101089958 A 12/2007
(Continued)

OTHER PUBLICATIONS

International Search Report corresponding to PCT/CN2013/077150, dated Sep. 19, 2013 (11 pages).

*Primary Examiner* — Emmanuel Bayard
(74) *Attorney, Agent, or Firm* — Maginot, Moore & Beck, LLP

(57) ABSTRACT

A method, system and apparatus for audio communication modulation mode self-adaptation, and an electronic signature token are provided. The method includes generating a first audio detection frame; if the first audio detection frame is correct, selecting the modulation mode supported by the second device corresponding to the identifier of the modulation mode supported by the second device from pre-stored modulation modes supported by the second device according to the identifier of modulation mode supported by the second device carried in the first audio detection frame, and generating a first audio detection feedback frame; if the first audio detection feedback frame is correct, demodulating an audio data frame from the second device using a demodulation mode corresponding to the modulation mode sup-
(Continued)

ported by the second device, and demodulating an audio data frame from the first device using a demodulation mode corresponding to the modulation mode supported by the first device.

20 Claims, 2 Drawing Sheets

(52) U.S. Cl.
CPC ...... *H04L 27/0012* (2013.01); *H04R 2420/07* (2013.01); *H04R 2499/11* (2013.01)

(58) Field of Classification Search
USPC .......................... 375/219–222, 268, 356, 358
See application file for complete search history.

(56) References Cited

U.S. PATENT DOCUMENTS

| 7,518,661 | B2* | 4/2009 | Alderson | H04N 5/46 348/462 |
| 8,112,033 | B2* | 2/2012 | Xue | H04B 7/15521 370/274 |
| 8,190,105 | B2* | 5/2012 | Hagiwara | H04B 1/74 375/260 |
| 8,311,142 | B2* | 11/2012 | Gao | H04L 1/0028 375/260 |
| 8,885,455 | B2* | 11/2014 | Wu | H04L 1/0003 370/204 |
| 2007/0142944 | A1* | 6/2007 | Goldberg | G10H 1/0025 700/94 |
| 2008/0145058 | A1* | 6/2008 | Fukae | H04L 25/0262 398/118 |
| 2008/0181148 | A1* | 7/2008 | Lee | H04L 65/604 370/310 |
| 2008/0187162 | A1* | 8/2008 | Lee | H04M 1/05 381/380 |
| 2015/0139438 | A1* | 5/2015 | Li | H04R 3/00 381/77 |
| 2015/0163278 | A1* | 6/2015 | Li | H04L 27/0008 370/474 |
| 2015/0180688 | A1* | 6/2015 | Li | H04L 27/0008 381/77 |

FOREIGN PATENT DOCUMENTS

| CN | 101868949 A | 10/2010 |
| CN | 102821076 A | 12/2012 |
| WO | 2014000575 A1 | 1/2014 |

* cited by examiner

METHOD, SYSTEM AND APPARATUS FOR AUDIO COMMUNICATION MODULATION MODES SELF-ADAPTATION, AND ELECTRONIC SIGNATURE TOKEN

CROSS REFERENCE TO RELATED APPLICATION

This U.S. application claims priority under 35 U.S.C. 371 to, and is a U.S. National Stage application of, the International Patent Application No. PCT/CN2013/077150, filed Jun. 13, 2013, which claims the benefit of prior Chinese Application No. 201210226853.8 filed Jun. 29, 2012. The entire contents of the above-mentioned patent applications are incorporated herein by reference as part of the disclosure of this U.S. application.

FIELD

The present disclosure relates to an electronic technique field, and more particularly to a method for audio communication modulation mode self-adaptation, a system for audio communication modulation mode self-adaptation, an apparatus for audio communication modulation mode self-adaptation in a mobile terminal, and an electronic signature token.

BACKGROUND

In a current audio data transmission via an audio interface, different mobile terminals have different audio transmission characteristics. In order to be compatible with the audio transmission characteristics of different mobile terminals, an apparatus (such as an electronic signature token) communicating with the mobile terminal needs to try with audio data in different modulation modes automatically so as to find a most suitable modulation mode matched with each of the different mobile terminals.

Currently, there are few audio communication means, and consequently no suitable mode can be compatible with the communication between different mobile terminals and different electronic signature tokens.

Moreover, since both sides in the communication may not necessarily be fixed and can have their own different audio transmission characteristics, when the modulation mode and the demodulation mode not matched with each other are adopted during the audio data transmission, a data interaction speed may be reduced and it is easy for a distortion to occur in the interactive data.

SUMMARY

Embodiments of the present disclosure seek to solve at least one of the problems existing in the related art.

Accordingly, a first objective of the present disclosure is to provide a method for audio communication modulation mode self-adaptation, which can determine an audio modulation mode and an audio demodulation mode quickly, such that audio data interaction may be performed quickly and the distortion degree of the interactive data may be largely reduced. A second objective of the present disclosure is to provide a system for audio communication modulation mode self-adaptation. A third objective of the present disclosure is to provide an apparatus for audio communication modulation mode self-adaptation in a mobile terminal. A fourth objective of the present disclosure is to provide an electronic signature token.

In order to achieve the above objectives, a method for audio communication modulation mode self-adaptation according to embodiments of a first aspect of the present disclosure includes the following steps: modulating by a first device an identifier of a modulation mode supported by the first device and an identifier of a modulation mode supported by a second device using the modulation mode supported by the first device according to a predetermined rule to generate a first audio detection frame; sending the first audio detection frame to the second device; determining whether the first audio detection frame is correct, after the second device receives the first audio detection frame; if the first audio detection frame is correct, selecting by the second device the modulation mode supported by the second device corresponding to the identifier of the modulation mode supported by the second device from pre-stored modulation modes supported by the second device according to the identifier of the modulation mode supported by the second device carried in the first audio detection frame, and modulating by the second device the identifier of the modulation mode supported by the first device and the identifier of the modulation mode supported by the second device carried in the first audio detection frame using the modulation mode supported by the second device to generate a first audio detection feedback frame; sending the first audio detection feedback frame to the first device; determining whether the first audio detection feedback frame is correct, after the first device receives the first audio detection feedback frame; and if the first audio detection feedback frame is correct, demodulating by the first device an audio data frame from the second device using a demodulation mode corresponding to the modulation mode supported by the second device, and demodulating by the second device an audio data frame from the first device using a demodulation mode corresponding to the modulation mode supported by the first device.

The method for audio communication modulation mode self-adaption according to embodiments of the present disclosure may automatically and quickly determine the optimal audio modulation and demodulation modes for data interaction between the first device and the second device, so as to quickly perform the interaction of audio data (i.e. data transmitted in audio formats) and considerably reduce the distortion degree of the interactive data.

In an embodiment of the present disclosure, the predetermined rule includes combining a first modulation mode or a second modulation mode supported by the first device with a first modulation mode or a second modulation mode supported by the second device to obtain sets, setting a weight value for each set, and sequentially selecting the sets according to a magnitude of the weight values.

In an embodiment of the present disclosure, the method further includes: if the first device does not receive the first audio detection feedback frame, or if the first audio detection feedback frame is wrong, modulating by the first device the identifier of the first modulation mode supported by the first device and an identifier of the second modulation mode supported by the second device using the first modulation mode supported by the first device according to the predetermined rule to generate a second audio detection frame, or modulating by the first device an identifier of the second modulation mode supported by the first device and the identifier of the first modulation mode supported by the second device using the second modulation mode supported by the first device according to the predetermined rule to generate a third audio detection frame, or modulating by the first device the identifier of the second modulation mode supported by the first device and the identifier of the second modulation mode supported by the second device using the second modulation mode supported by the first device according to the predetermined rule to generate a fourth audio detection frame.

In an embodiment of the present disclosure, the modulation modes are an amplitude modulation, a frequency modulation, a carrier modulation, or a subcarrier modulation.

In an embodiment of the present disclosure, each of the first audio detection frame and the first audio detection feedback frame includes data in a predetermined fixed format and/or transmission data containing variable contents.

In an embodiment of the present disclosure, determining whether the first audio detection frame is correct includes: determining whether the data in the predetermined fixed format carried in the first audio detection frame is correct, and if yes, determining that the first audio detection frame is correct; determining whether the first audio detection feedback frame is correct includes: determining whether the data in the predetermined fixed format carried in the first audio detection feedback frame is correct, and if yes, determining that the first audio detection feedback frame is correct.

In an embodiment of the present disclosure, the first device is a mobile terminal and the second device is an electronic signature token.

In order to achieve the above objectives, a system for audio communication modulation mode self-adaptation according to embodiments of a second aspect of the present disclosure includes a first device and a second device connected with each other via an audio interface, in which the first device is configured for modulating an identifier of a modulation mode supported by the first device and an identifier of a modulation mode supported by a second device using the modulation mode supported by the first device according to a predetermined rule to generate a first audio detection frame, sending the first audio detection frame to the second device, determining whether a first audio detection feedback frame is correct after receiving the first audio detection feedback frame from the second device, and if yes, demodulating an audio data frame from the second device using a demodulation mode corresponding to the modulation mode supported by the second device; and the second device is configured for determining whether the first audio detection frame is correct after receiving the first audio detection frame, and if yes, selecting the modulation mode supported by the second device corresponding to the identifier of the modulation mode supported by the second device from pre-stored modulation modes supported by the second device according to the identifier of the modulation mode supported by the second device carried in the first audio detection frame, and modulating the identifier of the modulation mode supported by the first device and the identifier of the modulation mode supported by the second device carried in the first audio detection frame using the modulation mode supported by the second device to generate the first audio detection feedback frame, sending the first audio detection feedback frame to the first device, and if the first device determines that the first audio detection feedback frame is correct, demodulating an audio data frame from the first device using a demodulation mode corresponding to the modulation mode supported by the first device.

The system for audio communication modulation mode self-adaption according to embodiments of the present disclosure may automatically and quickly determine the optimal audio modulation and demodulation modes for data interaction between the first device and the second device, so as to quickly perform audio data interaction and considerably reduce the distortion degree of the interactive data.

In an embodiment of the present disclosure, the predetermined rule includes combining a first modulation mode or a second modulation mode supported by the first device with a first modulation mode or a second modulation mode supported by the second device to obtain sets, setting a weight value for each set, and sequentially selecting the sets according to a magnitude of the weight values.

In an embodiment of the present disclosure, the first device is further configured for: if the first device does not receive the first audio detection feedback frame, or if the first audio detection feedback frame is wrong, modulating the identifier of the first modulation mode supported by the first device and an identifier of the second modulation mode supported by the second device using the first modulation mode supported by the first device according to the predetermined rule to generate a second audio detection frame, or modulating an identifier of the second modulation mode supported by the first device and the identifier of the first modulation mode supported by the second device using the second modulation mode supported by the first device according to the predetermined rule to generate a third audio detection frame, or modulating the identifier of the second modulation mode supported by the first device and the identifier of the second modulation mode supported by the second device using the second modulation mode supported by the first device according to the predetermined rule to generate a fourth audio detection frame. In an embodiment of the present disclosure, each of the first audio detection frame and the first audio detection feedback frame includes data in a predetermined fixed format and/or transmission data containing variable contents.

In an embodiment of the present disclosure, the second device is further configured for determining whether the data in the predetermined fixed format carried in the first audio detection frame is correct, and if yes, determining that the first audio detection frame is correct; and the first device is further configured for determining whether the data in the predetermined fixed format carried in the first audio detection feedback frame is correct, and if yes, determining that the first audio detection feedback frame is correct.

In an embodiment of the present disclosure, the modulation modes are an amplitude modulation, a frequency modulation, a carrier modulation, or a subcarrier modulation.

In an embodiment of the present disclosure, the first device is a mobile terminal and the second device is an electronic signature token.

In order to achieve the above objectives, an audio data transmission apparatus for a mobile terminal according to embodiments of a third aspect of the present disclosure includes: a modulating module configured for modulating an identifier of a modulation mode supported by the apparatus and an identifier of a modulation mode supported by an electronic signature token using the modulation mode supported by the apparatus according to a predetermined rule to generate a first audio detection frame; a transceiver module configured for sending the first audio detection frame to the electronic signature token; a first determining module configured for determining whether a first audio detection feedback frame from the electronic signature token is received; a second determining module configured for determining whether the first audio detection feedback frame is correct if the first determining module determines that the first audio detection feedback frame from the electronic signature token is received; and a demodulating module configured for demodulating an audio data frame from the electronic signature token using a demodulation mode corresponding to the modulation mode supported by the electronic signature token, if the second determining module determines that the first audio detection feedback frame is correct.

The apparatus according to embodiments of the present disclosure may determine the optimal modulation and demodulation modes used by the mobile terminal and the electronic signature token via data interaction between the apparatus and the electronic signature token, thus enhancing the data interaction speed, saving time and ensuring the data interaction quality.

In an embodiment of the present disclosure, the predetermined rule includes combining a first modulation mode or a second modulation mode supported by the first device with a first modulation mode or a second modulation mode supported by the second device to obtain sets, setting a weight value for each set, and sequentially selecting the sets according to a magnitude of the weight values.

In an embodiment of the present disclosure, the modulating module is further configured for: if the first determining module determines that the first audio detection feedback frame is not received, or if the second determining module determines that the first audio detection feedback frame is wrong, modulating the identifier of the first modulation mode supported by the apparatus and an identifier of the second modulation mode supported by the electronic signature token using the first modulation mode supported by the apparatus according to the predetermined rule to generate a second audio detection frame, or modulating an identifier of the second modulation mode supported by the apparatus and the identifier of the first modulation mode supported by the electronic signature token using the second modulation mode supported by the apparatus according to the predetermined rule to generate a third audio detection frame, or modulating the identifier of the second modulation mode supported by the apparatus and the identifier of the second modulation mode supported by the electronic signature token using the second modulation mode supported by the apparatus according to the predetermined rule to generate a fourth audio detection frame, in which the transceiver module is further configured for sending the second audio detection frame, the third audio detection frame or the fourth audio detection frame to the electronic signature token.

In an embodiment of the present disclosure, the modulation modes are an amplitude modulation, a frequency modulation, a carrier modulation, or a subcarrier modulation.

In order to achieve the above objectives, an electronic signature token according to embodiments of a fourth aspect of the present disclosure includes: a first determining module configured for determining whether a first audio detection frame is received; a second determining module configured for determining whether the first audio detection frame is correct if the first determining module determines that the first audio detection frame is received; a modulating module configured for selecting a modulation mode supported by the electronic signature token corresponding to an identifier of a modulation mode supported by the electronic signature token from pre-stored modulation modes supported by the electronic signature token using the identifier of the modulation mode supported by the electronic signature token carried in the first audio detection frame if the second determining module determines that the first audio detection frame is correct, and modulating an identifier of a modulation mode supported by an audio data transmission apparatus for a mobile terminal and an identifier of the modulation mode supported by the electronic signature token carried in the first audio detection frame using the modulation mode supported by the electronic signature token to generate a first audio detection feedback frame; a transceiver module configured for receiving the first audio detection frame from the apparatus and sending the first audio detection feedback frame to the apparatus; and a demodulating module configured for demodulating an audio data frame from the apparatus using a demodulation mode corresponding to the modulation mode supported by the apparatus, if the apparatus determines that the first audio detection feedback frame is correct.

The electronic signature token according to embodiments of the present disclosure may perform data interaction with the mobile terminal quickly and determine the optimal modulation and demodulation modes, thus enhancing the data interaction speed and saving time. Moreover, due to the optimal modulation and demodulation modes, the distortion degree of the interactive data is reduced, thus ensuring the data interaction quality.

In an embodiment of the present disclosure, the modulation modes are an amplitude modulation, a frequency modulation, a carrier modulation, or a subcarrier modulation.

Additional aspects and advantages of the present disclosure will be given in part in the following descriptions, become apparent in part from the following descriptions, or be learned from the practice of the embodiments of the present disclosure.

BRIEF DESCRIPTION OF THE DRAWINGS

These and/or additional aspects and advantages of the present disclosure will become apparent and more readily appreciated from the following descriptions of embodiments made with reference to the drawings, in which.

DETAILED DESCRIPTION

Figure 1:
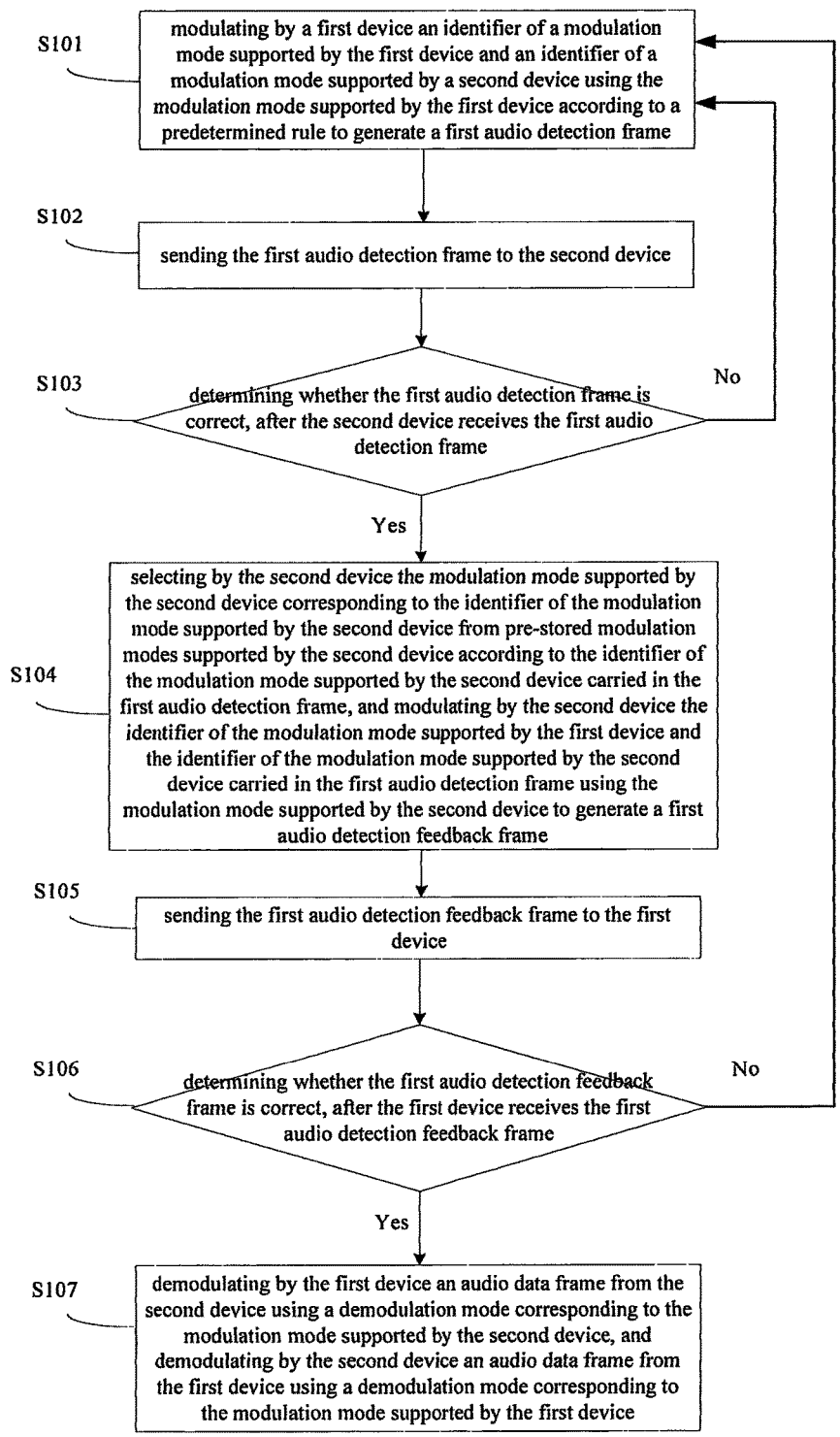
FIG. 1 is a flow chart of a method for audio communication modulation mode self-adaptation according to an embodiment of the present disclosure.

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals and/or alphabets may be repeated in different examples in the present disclosure. This repetition is for the purpose of simplification and clarity, and does not refer to relations between different embodiments and/or settings. Furthermore, examples of different processes and materials are provided in the present disclosure.

However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the present disclosure, unless specified or limited otherwise, the terms "mounted," "connected," "coupled" and the like are used broadly, and may be, for example, mechanical or electrical connections; may also be inner communications of two elements; may also be direct connections or indirect connections via intervening structures, which can be understood by those skilled in the art according to specific situations.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure include all the variants, modifications and their equivalents within the spirit and scope of the present disclosure as defined by the claims.

FIG. 1 is a flow chart of a method for audio communication modulation mode self-adaptation according to an embodiment of the present disclosure. As shown in FIG. 1, the method for audio communication modulation mode self-adaptation includes the following steps:

At step S101, a first device modulates an identifier of a modulation mode supported by the first device and an identifier of a modulation mode supported by a second device using the modulation mode supported by the first device according to a predetermined rule so as to generate a first audio detection frame.

The first device may be a mobile terminal that may include a mobile phone, a tablet PC (personal computer), etc. The second device may be an electronic signature token, such as an audio Key (i.e. a Key apparatus with an audio interface), which is a cipher key apparatus similar to a U shield except the data transmission mode. The first device and the second device according to embodiments of the present disclosure are not limited to the examples.

Specifically, the predetermined rule includes: combining a first modulation mode or a second modulation mode supported by the first device with a first modulation mode or a second modulation mode supported by the second device to obtain sets, setting a weight value for each set, and sequentially selecting the sets according to a magnitude of the weight values, in which the modulation modes are an amplitude modulation, a frequency modulation, a carrier modulation, or a subcarrier modulation. For example, there can be four sets: a set of the first modulation mode of the first device and the first modulation mode of the second device, a set of the first modulation mode of the first device and the second modulation mode of the second device, a set of the second modulation mode of the first device and the first modulation mode of the second device, and a set of the second modulation mode of the first device and the second modulation mode of the second device, which are sequenced according to the magnitude of the weight values. When an audio communication modulation mode is to be selected, the set with the highest weight value is first selected, for example, the set of the first modulation mode of the first device and the first modulation mode of the second device is selected.

The first device takes the identifier of the first modulation mode supported by the first device and the identifier of the first modulation mode supported by the second device as contents to be sent after selecting a set, and modulates them respectively according to the modulation mode supported by the first device to generate a first audio detection frame.

At step S102, the first audio detection frame is sent to the second device.

At step S103, the second device determines whether the first audio detection frame is correct, after receiving the first audio detection frame.

Specifically, the first audio detection frame includes data in a predetermined fixed format and/or transmission data containing variable contents. It is possible to determine whether the format of the first audio detection frame is correct by means of the data in a predetermined fixed format and/or transmission data containing variable contents. In an embodiment of the present disclosure, it is determined whether the data in the predetermined fixed format carried in the first audio detection frame is correct, and if yes, it is determined that the first audio detection frame is correct. Therefore, it is possible to ensure that the received data are reliable.

At step S104, if the first audio detection frame is correct, the second device selects the modulation mode supported by the second device corresponding to the identifier of the modulation mode supported by the second device from pre-stored modulation modes supported by the second device according to the identifier of the modulation mode supported by the second device carried in the first audio detection frame, and modulates the identifier of the modulation mode supported by the first device and the identifier of the modulation mode supported by the second device carried in the first audio detection frame using the modulation mode supported by the second device to generate a first audio detection feedback frame.

If the audio detection feedback frame is wrong, step S101 is returned to reselect the modulation mode supported by the first device and the modulation mode supported by the second device. Specifically, if the weight value of the set of the first modulation mode of the first device and the second modulation mode of the second device comes second, the identifier of the first modulation mode supported by the first device and the identifier of the second modulation mode supported by the second device are modulated using the first modulation mode supported by the first device to generate a second audio detection frame; if the weight value of the set of the second modulation mode of the first device and the first modulation mode of the second device comes second, the identifier of the second modulation mode supported by the first device and the identifier of the first modulation mode supported by the second device are modulated using the second modulation mode supported by the first device to generate a third audio detection frame; if the weight value of the set of the second modulation mode of the first device and the second modulation mode of the second device comes second, the identifier of the second modulation mode supported by the first device and the identifier of the second modulation mode supported by the second device are modulated using the second modulation mode supported by the first device to generate a fourth audio detection frame.

At step S105, the first audio detection feedback frame is sent to the first device.

At step S106, the first device determines whether the first audio detection feedback frame is correct after receiving the first audio detection feedback frame.

Specifically, the first audio detection feedback frame includes data in a predetermined fixed format and/or transmission data containing variable contents. It is possible to determine whether the format of the first audio detection feedback frame is correct by means of the data in a predetermined fixed format and/or transmission data containing variable contents. In an embodiment of the present disclosure, it is determined whether the data in the predetermined fixed format carried in the first audio detection feedback frame is correct, and if yes, it is determined that the first audio detection frame is correct. Therefore, it is possible to ensure that the received data are reliable.

If the first audio detection feedback frame is wrong, step S101 is returned to reselect the modulation mode supported by the first device and the modulation mode supported by the second device.

At step S107, if the first audio detection feedback frame is correct, the first device demodulates an audio data frame from the second device using a demodulation mode corresponding to the modulation mode supported by the second device, and the second device demodulates an audio data frame from the first device using a demodulation mode corresponding to the modulation mode supported by the first device.

Specifically, the first device demodulates the audio data frame sent from the second device, using the demodulation mode corresponding to the modulation mode supported by the second device, while the second device demodulates the audio data frame sent from the first device, using the demodulation mode corresponding to the modulation mode supported by the first device.

The method for audio communication modulation mode self-adaption according to embodiments of the present disclosure may automatically and quickly determine the optimal audio modulation and demodulation modes for data interaction between the first device and the second device, so as to quickly perform the interaction of audio data (i.e. data transmitted in audio formats) and considerably reduce the distortion degree of the interactive data.

Figure 2:
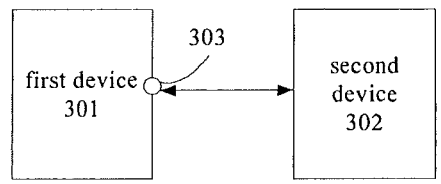
FIG. 2 is a schematic diagram of a system for audio communication modulation mode self-adaptation according to an embodiment of the present disclosure.

In order to achieve the above objectives, the present disclosure also provides a system for audio communication modulation mode self-adaptation. FIG. 2 is a schematic diagram of a system for audio communication modulation mode self-adaptation according to an embodiment of the present disclosure. As shown in FIG. 2, the system for audio communication modulation mode self-adaptation includes a first device 301 and a second device 302 connected with each other via an audio interface 303.

The first device 301 may be a mobile terminal that may include a mobile phone, a tablet PC (personal computer), etc. The second device 302 may be an electronic signature token, such as an audio Key (i.e. a Key apparatus with an audio interface), which is a cipher key apparatus similar to a U shield except the data transmission mode. The first device 301 and the second device 302 according to embodiments of the present disclosure are not limited to the examples.

Specifically, the first device 301 is configured for modulating an identifier of a modulation mode supported by the first device 301 and an identifier of a modulation mode supported by a second device 302 using the modulation mode supported by the first device 301 according to a predetermined rule to generate a first audio detection frame, sending the first audio detection frame to the second device 302, determining whether a first audio detection feedback frame is correct after receiving the first audio detection feedback frame from the second device 302, and if yes, demodulating an audio data frame from the second device 302 using a demodulation mode corresponding to the modulation mode supported by the second device 302.

More specifically, the predetermined rule includes: combining a first modulation mode or a second modulation mode supported by the first device 301 with a first modulation mode or a second modulation mode supported by the second device 302 to obtain sets, setting a weight value for each set, and sequentially selecting the sets according to a magnitude of the weight values, in which the modulation modes are an amplitude modulation, a frequency modulation, a carrier modulation, or a subcarrier modulation. For example, there can be four sets: a set of the first modulation mode of the first device 301 and the first modulation mode of the second device 302, a set of the first modulation mode of the first device 301 and the second modulation mode of the second device 302, a set of the second modulation mode of the first device 301 and the first modulation mode of the second device 302, and a set of the second modulation mode of the first device 301 and the second modulation mode of the second device 302, which are sequenced according to the magnitude of the weight values. When an audio communication modulation mode is to be selected, the set with the highest weight value is first selected, for example, the set of the first modulation mode of the first device 301 and the first modulation mode of the second device 302 is selected.

The second device 302 is configured for determining whether the first audio detection frame is correct after receiving the first audio detection frame, and if yes, selecting the modulation mode supported by the second device 302 corresponding to the identifier of the modulation mode supported by the second device 302 from pre-stored modulation modes supported by the second device 302 according to the identifier of the modulation mode supported by the second device 302 carried in the first audio detection frame, and modulating the identifier of the modulation mode supported by the first device 301 and the identifier of the modulation mode supported by the second device 302 carried in the first audio detection frame using the modulation mode supported by the second device 302 to generate the first audio detection feedback frame, sending the first audio detection feedback frame to the first device 301, and if the first device 301 determines that the first audio detection feedback frame is correct, demodulating an audio data frame from the first device 301 using a demodulation mode corresponding to the modulation mode supported by the first device 301.

In an embodiment of the present disclosure, the first device 301 is further configured for: if the first device 301 does not receive the first audio detection feedback frame, or if the first audio detection feedback frame is wrong, modulating the identifier of the first modulation mode supported by the first device 301 and an identifier of the second modulation mode supported by the second device 302 using the first modulation mode supported by the first device 301 according to the predetermined rule to generate a second audio detection frame, or modulating an identifier of the second modulation mode supported by the first device 301 and the identifier of the first modulation mode supported by the second device 302 using the second modulation mode supported by the first device 301 according to the predetermined rule to generate a third audio detection frame, or modulating the identifier of the second modulation mode supported by the first device 301 and the identifier of the second modulation mode supported by the second device 302 using the second modulation mode supported by the first device 301 according to the predetermined rule to generate a fourth audio detection frame.

In an embodiment of the present disclosure, each of the first audio detection frame and the first audio detection feedback frame includes data in a predetermined fixed format and/or transmission data containing variable contents. The first device 301 determining whether the first audio detection frame is correct includes: determining whether the data in the predetermined fixed format carried in the first audio detection frame is correct, and if yes, determining that the first audio detection frame is correct. The second device 302 determining whether the first audio detection feedback frame is correct includes: determining whether the data in the predetermined fixed format carried in the first audio detection feedback frame is correct, and if yes, determining that the first audio detection feedback frame is correct. Therefore, it is possible to ensure that the received data are reliable.

The system for audio communication modulation mode self-adaptation according to embodiments of the present disclosure can quickly determine the optimal audio modulation and demodulation modes for data interaction between the first device and the second device, such that audio data interaction may be performed quickly and the distortion degree of the interactive data may be largely reduced.

Figure 3:
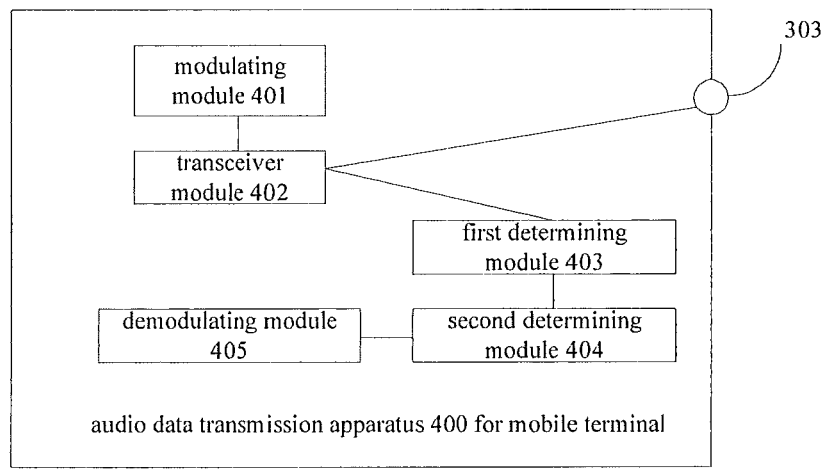
FIG. 3 is a schematic diagram of a mobile terminal according to an embodiment of the present disclosure.

In order to achieve the above objectives, the present disclosure also provides an audio data transmission apparatus for a mobile terminal. FIG. 3 is a schematic diagram of an audio data transmission apparatus for a mobile terminal according to an embodiment of the present disclosure. As shown in FIG. 3, the audio data transmission apparatus 400 includes an audio interface 303, a modulating module 401, a transceiver module 402, a first determining module 403, a second determining module 404 and a demodulating module 405.

Specifically, the audio interface 303 is configured for intercommunicating with an electronic signature token.

The modulating module 401 is configured for modulating an identifier of a modulation mode supported by the apparatus 400 and an identifier of a modulation mode supported by an electronic signature token using the modulation mode supported by the apparatus 400 according to a predetermined rule to generate a first audio detection frame, in which the modulation modes are an amplitude modulation, a frequency modulation, a carrier modulation, or a subcarrier modulation.

In an embodiment of the present disclosure, the predetermined rule includes: combining a first modulation mode and a second modulation mode supported by the apparatus 400 with a first modulation mode and a second modulation mode supported by the electronic signature token to obtain sets, setting a weight value for each set, and sequentially selecting the sets according to a magnitude of the weight values. For example, there can be four sets: a set of the first modulation mode of the apparatus 400 and the first modulation mode of the electronic signature token, a set of the first modulation mode of the apparatus 400 and the second modulation mode of the electronic signature token, a set of the second modulation mode of the apparatus 400 and the first modulation mode of the electronic signature token, and a set of the second modulation mode of the apparatus 400 and the second modulation mode of the electronic signature token, which are sequenced according to the magnitude of the weight values. When an audio communication modulation mode is to be selected, the set with the highest weight value is first selected, for example, the set of the first modulation mode of the apparatus and the first modulation mode of the electronic signature token is selected.

The transceiver module 402 is configured for sending the first audio detection frame to the electronic signature token, in which the transceiver module 402 sends the first audio detection frame via the audio interface 303.

The first determining module 403 is configured for determining whether the first audio detection feedback frame from the electronic signature token is received, in which the first determining module 403 is connected with the audio interface 303.

The second determining module 404 is configured for determining whether the first audio detection feedback frame is correct if the first audio detection feedback frame is received.

The demodulating module 405 is configured for demodulating an audio data frame from the electronic signature token using a demodulation mode corresponding to the modulation mode supported by the electronic signature token, if the second determining module 404 determines that the first audio detection feedback frame is correct.

The apparatus according to embodiments of the present disclosure may determine the optimal modulation and demodulation modes used by the mobile terminal and the electronic signature token via data interaction between the apparatus and the electronic signature token, thus enhancing the data interaction speed, saving time and ensuring the data interaction quality.

In an embodiment of the present disclosure, the modulating module 401 is further configured for: if the first determining module 403 determines that the first audio detection feedback frame is not received, or if the second determining module 404 determines that the first audio detection feedback frame is wrong, modulating the identifier of the first modulation mode supported by the apparatus and an identifier of the second modulation mode supported by the electronic signature token using the first modulation mode supported by the apparatus according to the predetermined rule to generate a second audio detection frame, or modulating an identifier of the second modulation mode supported by the apparatus and the identifier of the first modulation mode supported by the electronic signature token using the second modulation mode supported by the apparatus according to the predetermined rule to generate a third audio detection frame, or modulating the identifier of the second modulation mode supported by the apparatus and the identifier of the second modulation mode supported by the electronic signature token using the second modulation mode supported by the apparatus according to the predetermined rule to generate a fourth audio detection frame, in which the transceiver module 402 is further configured for sending the second audio detection frame, the third audio detection frame or the fourth audio detection frame to the electronic signature token.

Figure 4:
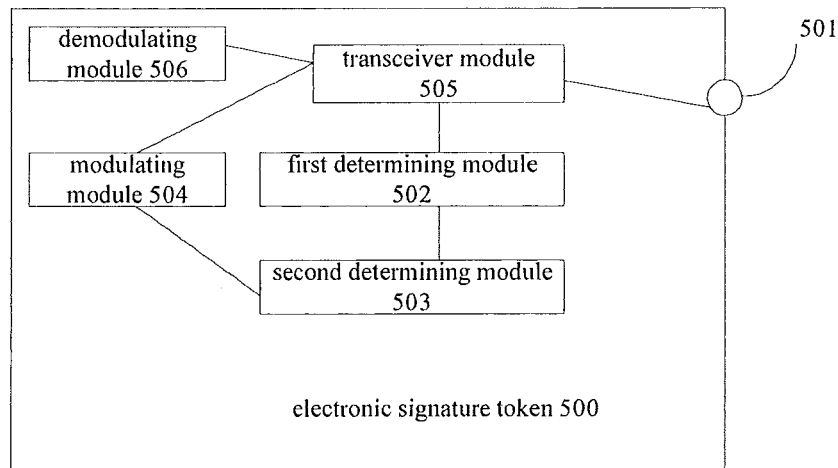
FIG. 4 is a schematic diagram of an electronic signature token according to an embodiment of the present disclosure.

In order to achieve the above objectives, the present disclosure also provides an electronic signature token. FIG. 4 is a schematic diagram of an electronic signature token according to an embodiment of the present disclosure. As shown in FIG. 4, the electronic signature token 500 includes a transmission interface 501, a first determining module 502, a second determining module 503, a modulating module 504, a transceiver module 505 and a demodulating module 506.

Specifically, the transmission interface 501 is configured for intercommunicating with the apparatus 400, and is generally an interface matched with mobile terminals, such as an audio interface. The first determining module 502 is configured for determining whether the first audio detection frame is received. The second determining module 503 is configured for determining whether the first audio detection frame is correct, if the first determining module 502 determines that the first audio detection frame is received.

The modulating module 504 is configured for selecting a modulation mode supported by the electronic signature token corresponding to an identifier of a modulation mode supported by the electronic signature token from pre-stored modulation modes supported by the electronic signature token using the identifier of the modulation mode supported by the electronic signature token carried in the first audio detection frame, if the second determining module 503 determines that the first audio detection frame is correct, and modulating an identifier of a modulation mode supported by an audio data transmission apparatus for the apparatus 400 and an identifier of the modulation mode supported by the electronic signature token carried in the first audio detection frame using the modulation mode supported by the electronic signature token to generate a first audio detection feedback frame.

The transceiver module 505 is configured for receiving the first audio detection frame from the apparatus 400 and sending the first audio detection feedback frame to the apparatus 400. The demodulating module 506 is configured for demodulating an audio data frame from the apparatus 400 using a demodulation mode corresponding to the modulation mode supported by the apparatus 400, if the apparatus 400 determines that the first audio detection feedback frame is correct, in which the information indicating the apparatus 400 determines that the first audio detection feedback frame is correct, is acquired by the transceiver module 505.

In an embodiment of the present disclosure, the modulation modes are an amplitude modulation, a frequency modulation, a carrier modulation, or a subcarrier modulation.

The electronic signature token according to embodiments of the present disclosure may perform data interaction with the mobile terminal quickly and determine the optimal modulation and demodulation modes, thus enhancing the data interaction speed and saving time. Moreover, due to the optimal modulation and demodulation modes, the distortion degree of the interactive data is reduced, thus ensuring the data interaction quality.

It will be understood that the flow chart or any process or method described herein in other manners may represent a module, segment, or portion of code that includes one or more executable instructions to implement the specified logic function(s) or the steps of the progress. Moreover, it will be appreciated by those skilled in the art that the preferred embodiments of the present disclosure contain other realizations, not necessarily in the sequence shown or discussed herein but including sequences substantially same with or opposite the involved functions, to implement the functions.

The logic and/or step shown in the flow chart or described in other manners herein, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to (a non-exhaustive list): an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate media capable of printing the programs thereon, this is because, for example, the paper or other appropriate media may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, optical disks, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. The scope of the present disclosure is defined by the claims and the like.

What is claimed is:

1. A method for audio communication modulation mode self-adaption, comprising:
modulating by a first device an identifier of a modulation mode supported by the first device and an identifier of a modulation mode supported by a second device using the modulation mode supported by the first device according to a predetermined rule to generate a first audio detection frame;
sending the first audio detection frame to the second device;
determining whether the first audio detection frame is correct, after the second device receives the first audio detection frame;
if the first audio detection frame is correct, selecting by the second device the modulation mode supported by the second device corresponding to the identifier of the modulation mode supported by the second device from pre-stored modulation modes supported by the second device according to the identifier of modulation mode supported by the second device carried in the first audio detection frame, and modulating by the second device the identifier of the modulation mode supported by the first device and the identifier of the modulation mode supported by the second device carried in the first audio detection frame using the modulation mode supported by the second device to generate a first audio detection feedback frame;
sending the first audio detection feedback frame to the first device;
determining whether the first audio detection feedback frame is correct, after the first device receives the first audio detection feedback frame; and
if the first audio detection feedback frame is correct, demodulating by the first device an audio data frame from the second device using a demodulation mode corresponding to the modulation mode supported by the second device, and demodulating by the second device an audio data frame from the first device using a demodulation mode corresponding to the modulation mode supported by the first device.

2. The method according to claim 1, wherein the predetermined rule comprises combining a first modulation mode or a second modulation mode supported by the first device with a first modulation mode or a second modulation mode supported by the second device to obtain sets, setting a weight value for each set, and sequentially selecting the sets according to a magnitude of the weight values.

3. The method according to claim 2, further comprising:
if the first device does not receive the first audio detection feedback frame, or if the first audio detection feedback frame is wrong,
modulating by the first device the identifier of the first modulation mode supported by the first device and an identifier of the second modulation mode supported by the second device using the first modulation mode supported by the first device according to the predetermined rule to generate a second audio detection frame, or
modulating by the first device an identifier of the second modulation mode supported by the first device and the identifier of the first modulation mode supported by the second device using the second modulation mode supported by the first device according to the predetermined rule to generate a third audio detection frame, or
modulating by the first device the identifier of the second modulation mode supported by the first device and the identifier of the second modulation mode supported by the second device using the second modulation mode supported by the first device according to the predetermined rule to generate a fourth audio detection frame.

4. The method according to claim 1, wherein each of the first audio detection frame and the first audio detection feedback frame comprises data in a predetermined fixed format and/or transmission data containing variable contents.

5. The method according to claim 4, wherein
determining whether the first audio detection frame is correct comprises:
determining whether the data in the predetermined fixed format carried in the first audio detection frame is correct, and if yes, determining that the first audio detection frame is correct;
determining whether the first audio detection feedback frame is correct comprises:
determining whether the data in the predetermined fixed format carried in the first audio detection feedback frame is correct, and if yes, determining that the first audio detection feedback frame is correct.

6. The method according to claim 1, wherein the modulation modes are an amplitude modulation, a frequency modulation, a carrier modulation, or a subcarrier modulation.

7. The method according to claim 1, wherein the first device is a mobile terminal and the second device is an electronic signature token.

8. A system for audio communication modulation mode self-adaption, comprising a first device and a second device connected with each other via an audio interface, wherein
the first device is configured for modulating an identifier of a modulation mode supported by the first device and an identifier of a modulation mode supported by a second device using the modulation mode supported by the first device according to a predetermined rule to generate a first audio detection frame, sending the first audio detection frame to the second device, determining whether a first audio detection feedback frame is correct after receiving the first audio detection feedback frame from the second device, and if yes, demodulating an audio data frame from the second device using a demodulation mode corresponding to the modulation mode supported by the second device;
the second device is configured for determining whether the first audio detection frame is correct after receiving the first audio detection frame, and if yes, selecting the modulation mode supported by the second device corresponding to the identifier of the modulation mode supported by the second device from pre-stored modulation modes supported by the second device according to the identifier of the modulation mode supported by the second device carried in the first audio detection frame, and modulating the identifier of the modulation mode supported by the first device and the identifier of the modulation mode supported by the second device carried in the first audio detection frame using the modulation mode supported by the second device to generate the first audio detection feedback frame, sending the first audio detection feedback frame to the first device, and if the first device determines that the first audio detection feedback frame is correct, demodulating an audio data frame from the first device using a demodulation mode corresponding to the modulation mode supported by the first device.

9. The system according to claim 8, wherein the predetermined rule comprises combining a first modulation mode and a second modulation mode supported by the first device with a first modulation mode and a second modulation mode supported by the second device to obtain sets, setting a weight value for each set, and sequentially selecting the sets according to a magnitude of the weight values.

10. The system according to claim 9, wherein the first device is further configured for:
if the first device does not receive the first audio detection feedback frame, or if the first audio detection feedback frame is wrong,
modulating the identifier of the first modulation mode supported by the first device and an identifier of the second modulation mode supported by the second device using the first modulation mode supported by the first device according to the predetermined rule to generate a second audio detection frame, or
modulating an identifier of the second modulation mode supported by the first device and the identifier of the first modulation mode supported by the second device using the second modulation mode supported by the first device according to the predetermined rule to generate a third audio detection frame, or
modulating the identifier of the second modulation mode supported by the first device and the identifier of the second modulation mode supported by the second device using the second modulation mode supported by the first device according to the predetermined rule to generate a fourth audio detection frame.

11. The system according to claim 8, wherein each of the first audio detection frame and the first audio detection feedback frame comprises data in a predetermined fixed format and/or transmission data containing variable contents.

12. The system according to claim 11, wherein
the second device is further configured for determining whether the data in the predetermined fixed format carried in the first audio detection frame is correct, and if yes, determining that the first audio detection frame is correct;
the first device is further configured for determining whether the data in the predetermined fixed format carried in the first audio detection feedback frame is correct, and if yes, determining that the first audio detection feedback frame is correct.

13. The system according to claim 8, wherein the modulation modes are an amplitude modulation, a frequency modulation, a carrier modulation, or a subcarrier modulation.

14. The system according to claim 8, wherein the first device is a mobile terminal and the second device is an electronic signature token.

15. An audio data transmission apparatus for a mobile terminal, comprising:
an instruction execution system; and
a memory for storing instructions executable by the instruction execution system operable to perform acts of;
modulating an identifier of a modulation mode supported by the apparatus and an identifier of a modulation mode supported by an electronic signature token using the modulation mode supported by the apparatus according to a predetermined rule to generate a first audio detection frame;
sending the first audio detection frame to the electronic signature token;
determining whether a first audio detection feedback frame from the electronic signature token is received;
determining whether the first audio detection feedback frame is correct if a determination is made that the first audio detection feedback frame from the electronic signature token is received; and
demodulating an audio data frame from the electronic signature token using a demodulation mode corresponding to the modulation mode supported by the electronic signature token, if a determination is made that the first audio detection feedback frame is correct.

16. The apparatus according to claim 15, wherein the predetermined rule comprises combining a first modulation mode and a second modulation mode supported by the apparatus with a first modulation mode and a second modulation mode supported by the electronic signature token to obtain sets, setting a weight value for each set, and sequentially selecting the sets according to a magnitude of the weight values.

17. The apparatus according to claim 16, wherein the instruction execution system is further configured to perform acts of:
if the first audio detection feedback frame is determined not received, or if the first audio detection feedback frame is determined not correct,
then modulating the identifier of the first modulation mode supported by the apparatus and an identifier of the second modulation mode supported by the electronic signature token using the first modulation mode supported by the apparatus according to the predetermined rule to generate a second audio detection frame, or
then modulating an identifier of the second modulation mode supported by the apparatus and the identifier of the first modulation mode supported by the electronic signature token using the second modulation mode supported by the apparatus according to the predetermined rule to generate a third audio detection frame, or
then modulating the identifier of the second modulation mode supported by the apparatus and the identifier of the second modulation mode supported by the electronic signature token using the second modulation mode supported by the apparatus according to the predetermined rule to generate a fourth audio detection frame; and
sending the second audio detection frame, the third audio detection frame or the fourth audio detection frame to the electronic signature token.

18. The apparatus according to claim 15, wherein the modulation mode supported by the apparatus and the modulation mode supported by an electronic signature token are an amplitude modulation, a frequency modulation, a carrier modulation, or a subcarrier modulation.

19. An electronic signature token, comprising:
an instruction execution system; and
a memory for storing instructions executable by the instruction execution system operable to perform acts of;
determining whether a first audio detection frame is received;

determining whether the first audio detection frame is correct if a determination is made that the first audio detection frame is received;

selecting a modulation mode supported by the electronic signature token corresponding to an identifier of a modulation mode supported by the electronic signature token from pre-stored modulation modes supported by the electronic signature token using the identifier of the modulation mode supported by the electronic signature token carried in the first audio detection frame if a determination is made that the first audio detection frame is correct, and modulating an identifier of a modulation mode supported by an audio data transmission apparatus for a mobile terminal and the identifier of the modulation mode supported by the electronic signature token carried in the first audio detection frame using the modulation mode supported by the electronic signature token to generate a first audio detection feedback frame;

receiving the first audio detection frame from the apparatus and sending the first audio detection feedback frame to the apparatus; and demodulating an audio data frame from the apparatus using a demodulation mode corresponding to the modulation mode supported by the apparatus, if the apparatus determines that the first audio detection feedback frame is correct.

20. The electronic signature token according to claim 19, wherein the pre-stored modulation modes are an amplitude modulation, a frequency modulation, a carrier modulation, or a subcarrier modulation.

* * * * *